United States Patent [19]
Yang

[11] Patent Number: 4,976,173
[45] Date of Patent: Dec. 11, 1990

[54] MANUAL ELECTRIC TOOL

[76] Inventor: Tai-Her Yang, 5-1 Taipin Street, Si-Hu Town, Dzan-Hwa, Taiwan

[21] Appl. No.: 385,454

[22] Filed: Jul. 27, 1989

Related U.S. Application Data

[63] Continuation-in-part of Ser. No. 270,466, Nov. 9, 1988, abandoned, which is a continuation of Ser. No. 156,027, Feb. 16, 1988, abandoned.

[30] Foreign Application Priority Data

Feb. 24, 1987 [GB] United Kingdom ............... 8704265

[51] Int. Cl.$^5$ ............................................. B25B 21/00
[52] U.S. Cl. ...................................... 81/54; 81/177.8; 173/46; 7/158; 7/167; 279/14; 408/20.
[58] Field of Search ................. 81/54, 177.1, 177.8; 173/12, 148, 163, 46, 47; 7/158, 167; 279/14; 408/20, 21, 124

[56] References Cited

U.S. PATENT DOCUMENTS

| | | | |
|---|---|---|---|
| 1,805,005 | 5/1931 | Phillips | 7/167 |
| 3,603,782 | 9/1971 | Wortmann | 7/167 X |
| 3,783,955 | 1/1974 | Gill | 408/20 X |
| 4,522,270 | 6/1985 | Kishi | 81/177.1 X |

Primary Examiner—James G. Smith
Attorney, Agent, or Firm—Leonard Bloom

[57] ABSTRACT

A manual electric tool which has a housing having a handle and a body. The housing has a socket formed in the body and electrical contacts are accessible internally of the socket. The electrical contacts are connected to a source of energy through the handle. A removable power unit is adapted to be received within the socket and retained within the housing. A second pair of electrical contacts are carried by the power unit and adapted to engage the electrical contacts in the socket when the power unit is inserted in the socket. A motor in the power unit is connected to the electrical contacts. A shaft driven by the motor protrudes beyond the power unit. The shaft receives a tool implement on the protruding portion. The power unit has opposite end portions and the shaft protrudes beyond each end. The opposite end portions of the shaft may be directly driven by the motor, may be driven through a speed reduction gearing or combinations thereof. Other embodiments may not have an electric motor in the power unit and have directly powered implements at opposite ends of the power unit. In this manner, the power unit may be inserted into the socket in a desired orientation to provide two distinct implements.

13 Claims, 4 Drawing Sheets

FIG. 2-1

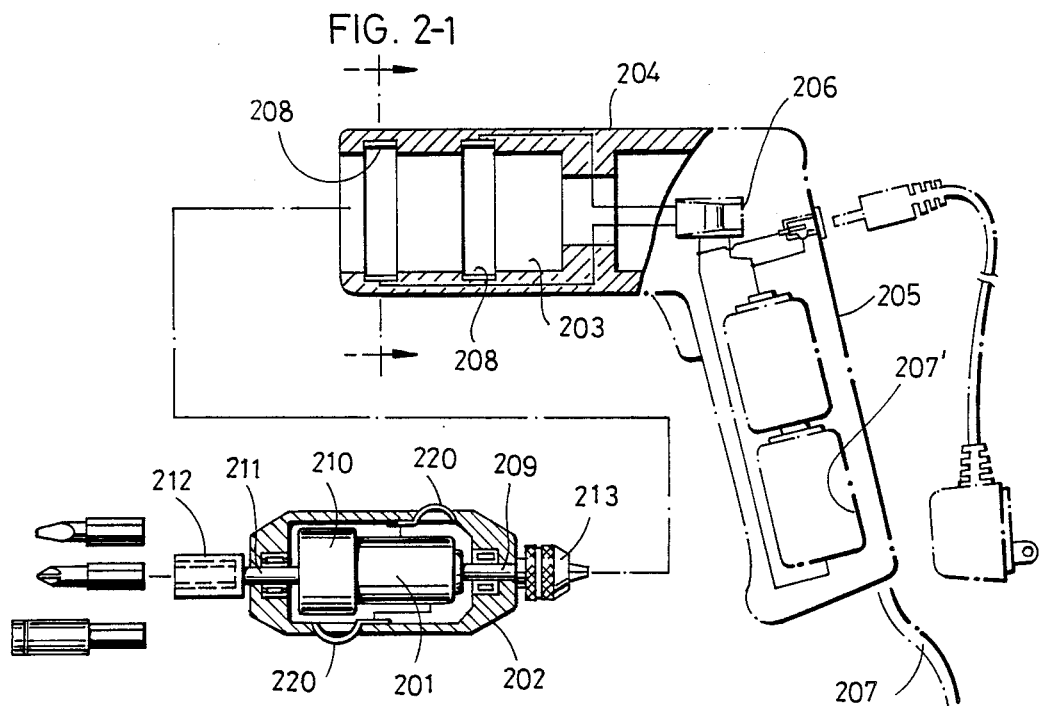
FIG. 2
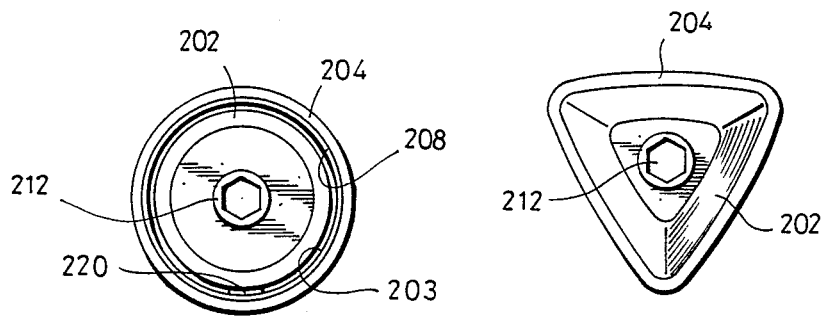
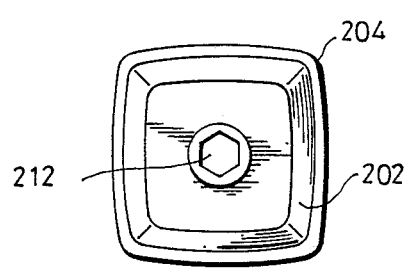
FIG. 2-1
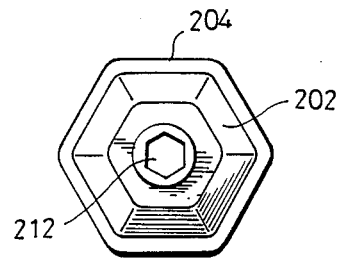
FIG. 2-2
FIG. 2-3
FIG. 2-4

MANUAL ELECTRIC TOOL

CROSS-REFERENCE TO RELATED APPLICATION

The present application is a continuation-in-part of application Ser. No. 270,466 filed Nov. 9, 1988 which in turn is a file wrapper continuation of Ser. No. 156,027 filed Feb. 16, 1988 both now abandoned, which applications are copending herewith, and the disclosures of which are incorporated herein by their entirety.

FIELD OF THE INVENTION

The present invention relates to a manual electric tool and in particular to a removable power unit which has an electric motor and can be used with various tool implements.

BACKGROUND OF THE INVENTION

There are numerous small electrically operated hand tools currently available to serve various purposes For example, there are screw drivers, drills, polishers, lamps, wrenches and vacuum cleaners. Because of differences in the speed of operation, torque, etc., these are usually manufactured and sold as separate and individual tools. The availability of a single manual electrical tool which could be adapted to function in a multitude of uses would be a great convenience and economic benefit to the user.

SUMMARY OF THE INVENTION

Accordingly, it is a primary object of the invention to provide a manual electric power unit which can be used with various types of tool implements.

It is a further object of the invention tc provide a manual electric power unit which has a motor driven member which activates a high speed shaft and a low speed shaft.

It is still a further object of the invention to provide a motor driven member which may be removed from a socket in the housing and reinserted in the housing in a reverse orientation to provide distinct speeds for the tool.

It is yet another object of the invention to provide an electrically powered tool having a member which may be removed from a socket in the housing and reinserted in the housing in a reverse orientation to provide access to two different tool implements which are available on opposite ends of the member.

In accordance with the teachings of the present invention, there is disclosed an electric tool including a housing having a handle. The housing has a forwardly-opening socket formed therein. A first pair of spaced-apart electrical contacts is carried by the housing and accessible internally of the socket. Means are provided within the handle for connecting the first pair of contacts with a source of electrical energy. A power unit is adapted to be received within the socket and retained within the housing. A second pair of spaced-apart electrical contacts is carried by the power unit and adapted to engage the first pair of spaced-apart electrical contacts when the power unit is inserted into the socket in the housing. A motor is disposed in the power unit and connected to the source of electrical energy through the engaging first and second pairs of electrical contacts, respectively. A shaft is driven by the motor and a portion thereof protrudes beyond the power unit. Means are carried by the protruding portion of the shaft to receive a tool implement. Speed-reduction gearing is provided between the motor and the protruding portion of the shaft.

The power unit has two opposite end portic,ns with a shaft protruding beyond one end portion. The first shaft is driven by the motor through a speed reduction gearing Ihe second shaft is driven directly by the motor and protrudes beycnd the opposite end of the power unit. The power unit may be removed from the socket in the housing and reinserted in a reverse orientation to provide two distinct speeds for the tool.

A collet is carried by the first shaft at the one end of the power unit for receiving a selected screwdriver bit. A drill chuck is carried by the second shaft at the other end of the power unit for receiving a selected drill bit. The selected drill bit is driven directly by the motor for a relatively high-speed low-torque operation, and the selected screwdriver bit is driven by the motor through the speed-reduction gearing for a relatively low-speed high-torque operation. In this manner, the electric tool is adapted for use either as an electric drill or as an electric screwdriver by removal of the power unit from the socket in the housing and selective reinsertion therein in its desired orientation.

The handle comprises a depending pistol-grip handle pivotably connected to the housing. Clamping means are provided between the pivotable pistol-grip handle and the housing to retain the handle on the housing at a desired angular relationship with the housing.

In an alternate embodiment, the power unit has two opposite end portions, one end portion is adapted to receive a first electric implement and the other end portion is adapted to receive a second electric implement. The power unit may be removed from the socket in the housing and reinserted in a desired orientation to provide for use of the selected implement Still other objects of the present invention will become readily apparent to those skilled in this art from the following description, wherein there is shown and descrit,ed a preferred embodiment of this invention. Simply by way of illustration, the invention will be set forth in part in the description that follows and in part will become apparent to thcse skilled in the art upon examination of the following or may be learned with the practice of the invention. Accordingly, the drawings and descriptions will be regarded as illustrative in nature and not as restrictive.

BRIEF DESCRIPTION OF THE DRAWINGS

FIG. 1—1 is an exploded view showing the handle and the means of clamping the handle with the body.

FIG. 2 is an exploded side view showing the handle clamped to the body with the power unit and body illustrated in cross section.

FIG. 2-1 is a sectional view across the lines 2-1 of FIG. 2 showing a circular shaped body FIG. 2—2 is a sectional view across the lines 2-1 of FIG. 2 showing a triangular shaped body.

FIG. 2-3 is a sectional view across the lines 2-1 of FIG. 2 showing a square shaped body.

FIG. 2-4 is a sectional view across the lines 2-1 of FIG. 2 showing a hexagonal shaped body.

FIG. 2-5 is a perspective view showing insertion of the power unit into the body and a locking knob for securing the unit therein.

FIG. 2-6 is a perspective view showing insertion of the power unit into the body and a key and keyway for securing the unit therein.

FIG. 2-7 is a perspective view showing insertion of the power unit into the body and a threaded cap to secure the unit to cooperating threads on the body.

FIG. 3 is an exploded side view showing the handle clamped to another embodiment of the body and power unit with the body and power unit in cross section.

FIG. 4 is a side view showing the power unit combined with a vacuum cleaner.

BRIEF DESCRIPTION OF THE PREFERRED EMBODIMENTS

Figure 1:
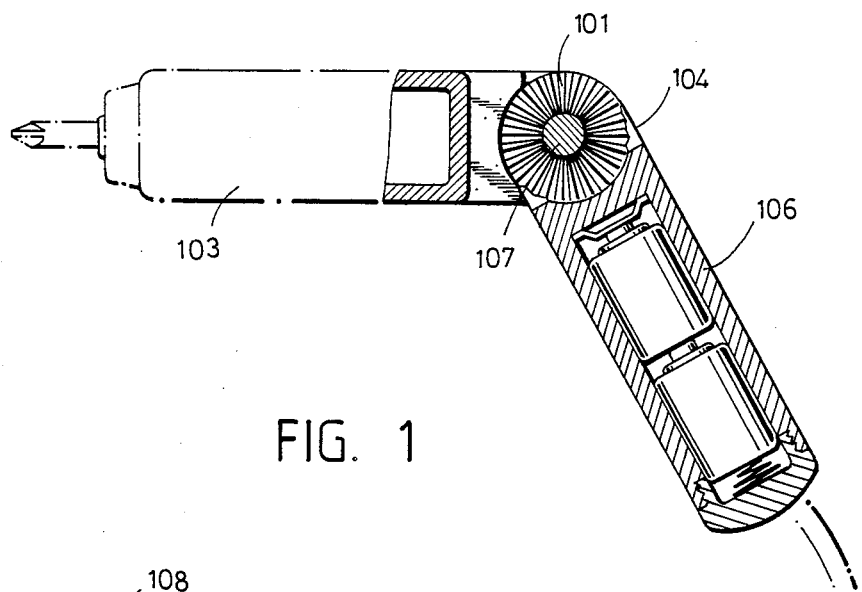
FIG. 1 is a side view of the present invention showing a partial cross section, and illustrating the pivotal clamping between the pistol grip handle and the body.
Figure 1:
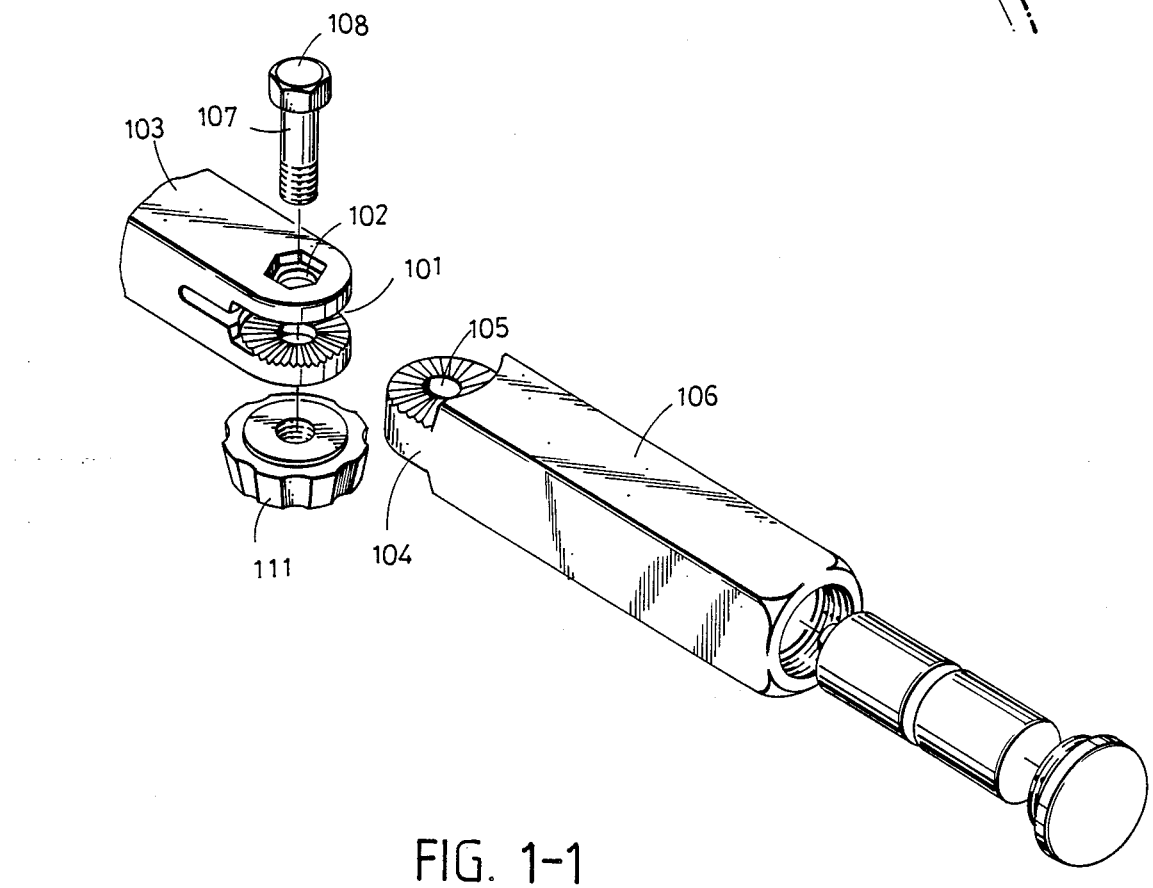

Referring now to the drawings, FIG. 1 shows the electric tool of the present invention having a housing comprising a body 103 and a handle 106. The handle 106 has a protruding lug 104 which has an opening 105 in the lug. The upper and lower surface of the lug is serrated The edge of the body 103 has a transverse slot 101 therein and, perpendicular to the axis of the transverse slot 101, is an opening 102. A threaded bolt 107 with an enlarged head 108 is received in the opening 102 and passes through the opening. The edges of the transverse slot 108 are serrated and cooperate with the serrated surface on the lug 103 which is received in the slot 101. A knob 111, having a threaded opening therein, receives the bolt 107 and secures the handle 106 to the body 103.

Figures 2, 3, 4, 5:
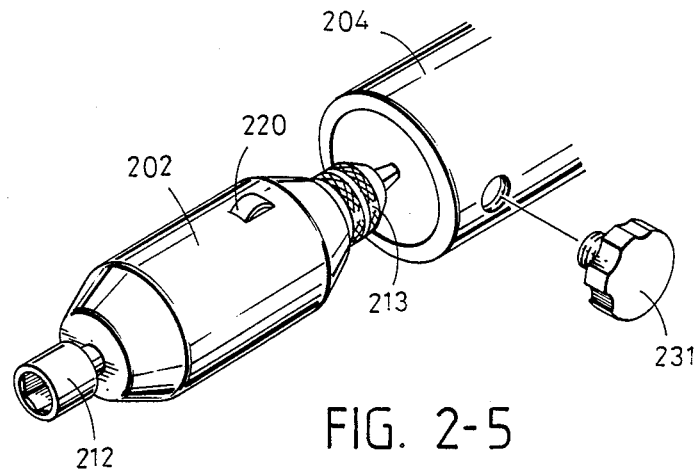
Figures 2, 3, 4, 5, 6:
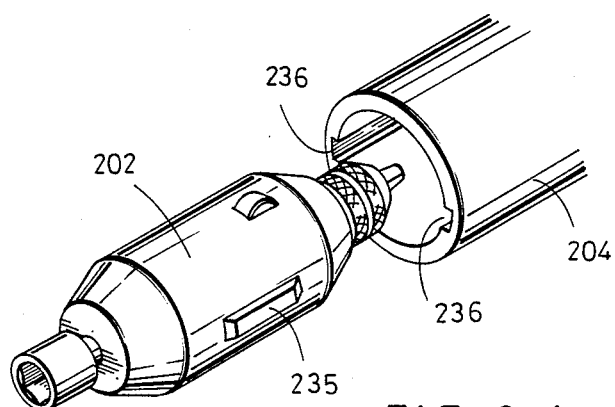
Figures 2, 3, 4, 5, 6, 7:
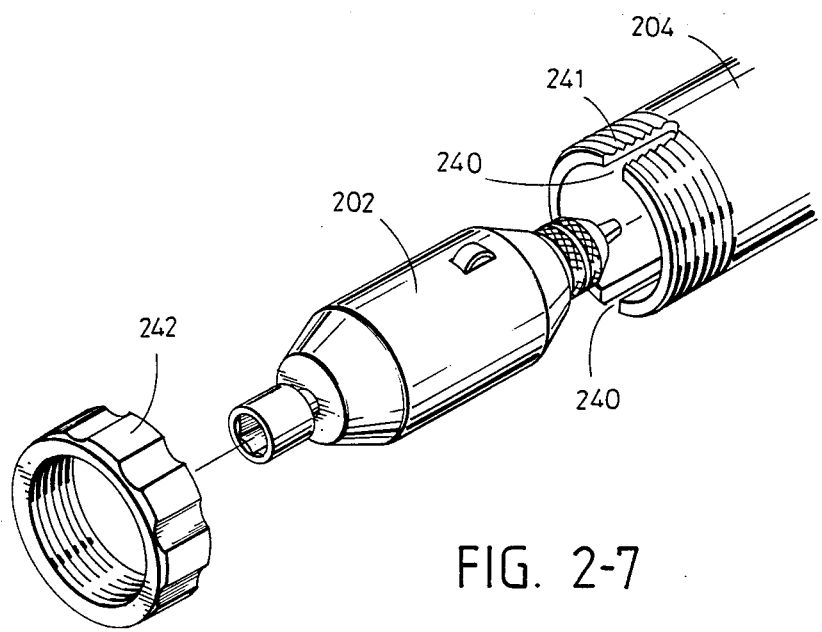
Figure 3:
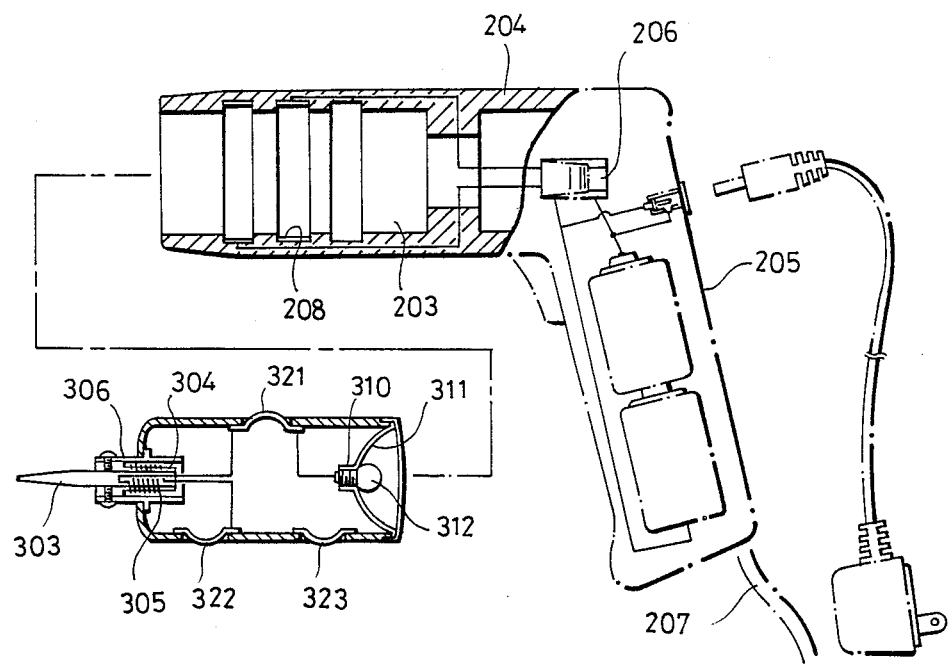
Figure 4:
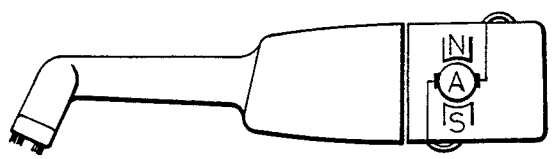

FIG. 2 shows the tool with the power unit 202 removed from the body 204. The body 204 is connected to the handle 202 and the body 204 has a forwardly opening socket 203 formed therein. The socket has a pair of spaced-apart electrical contacts 208 accessible internally thereto. The electrical contacts 208 are electrically connected to means within the handle 202 for providing a source of electrical energy. These may be batteries retained in a cavity 207' in the handle or a power line 207 for external energy. A switch 206 is provided to turn the energy on and off.

Disposed within the power unit 202 is an electric motor 201 which drives a first shaft 211 which protrudes from a one end portion of the power unit 202 and a second shaft 209 which protrudes from another end portion of the power unit 202, opposite to the one end portion. The first shaft 211 is driven by the motor 201 throuoh speed reduction gearing 210. A collet 212 is carried by the first shaft 211. A screwdriver set or other tool implement which requires relatively low speed, high torque operation may be received by the collet. The second shaft 209 is driven directly by the motor 201. A drill chuck 213 is carried by the second shaft 209. A tool implement such as a drill which requires relatively high speed, low torque operation may be received by the chuck 213. The power unit 202 further has a pair of spaced part electrical contacts 220 which are adapted to engage electrical contacts 208 in the socket 203 when the power unit 202 is inserted into the socket 203.

In this manner the power unit 202 may be inserted into socket in a desired orientation to provide two distinct speeds for the tool. The power unit 202 may be removed and inserted in the opposite orientation such as for example, to employ the drill to prepare a hole in a surface and then to reverse the power unit to provide a screw driver to drive a screw into the newly drilled hole.

The device may be of any geometric cross section such as shown in FIGS. 2-1 through 2-4 wherein the body 204 and the power unit 202 is illustrated as circular, triangular, rectangular and hexagonal respectively. Other polygonal cross-sections may be used.

Further, means for securing the power unit 202 in the socket 203 is shown in FIGS. 2-5 through 2-7. A threaded knob 231 inserted into a threaded opening in the side of the body 204 may be turned to engage the power unit 202 to prevent the power unit 202 from rotating in the body 204. An alternate embodiment provides a key 235 on either side of the power unit 202. The keys engage two corresponding keyways 236 in the socket 203 of the body 204. In still another embodiment, the body 204 is threaded 241 and has slots 240 in the end of the body. A threaded cap 242 with an opening therein engages the threaded body 241 thereby securing the power unit 202 in the socket 203.

In an alternate embodiment, the power unit may have direct drive shafts protruding from both end portions or the power unit may have speed reduction gearing 210 in both end portions. In yet another embodiment, as shown in FIG. 3, the removable unit may not have an electric motor but rather may have electrical implements which are powered directly such as a light bulb socket 310 mounted in a reflector 311 and receiving a light bulb 312. Another implement may be a solder iron have a tip 303, an insulating cap 304, an electric heating element 305 and a heat resistant cover 306. This unit has three spaced-apart electrical contacts, one 321 in the center and the other two 322, 323 on opposite sides of the center contact 321. The center contact 321 is common to the other two contacts 322, 232 to provide power to the electrical implements on either end of the removable unit. The socket 203 in the body 204 has three corresponding electrical contacts 208 to energize the removable unit when it is inserted in the socket 203.

As shown in FIG. 4, the removable unit may be a vacuum cleaner with conductive contacts to engage the contacts in the socket.

In addition, the device may also provide a socket into which a source of energy may be connected to charge the electric batteries as shown in FIGS. 2 and 3.

As described above, the device provides a single tool with a removable unit capable of performing a multiple of jobs. The removable unit has two operative ends on which two different tool implements may be mounted. The tool implements may be motor driven at high speed, low torque or at low speed, high torque and combinations thereof. Alternately, the tool implements may be electrical tools which are not motor driven. Thus, the present invention provides an economical, convenient and versatile electric tool.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An electric tool comprising a housing including a handle, the housing having a forwardly-opening socket formed therein, a first pair of spaced-apart electrical contacts carried by the housing and accessible internally of the socket, means within the handle for connecting the first pair of contacts with a source of electrical energy, a power unit adapted to be received within the socket and retained within the housing, a second pair of spaced-apart electrical contacts carried by the power unit and adapted to engage the first pair of spaced-apart electrical contacts when the power unit is inserted into the socket in the housing, a motor in the power unit and connected to the source of electrical energy through the engaging first and second pairs of electrical contacts, respectively, a shaft diven by the motor and having a portion thereof protruding beyond the power unit, means carried by the protruding portion of the shaft to receive a tool implement, and speed-reduction gearing between the motor and the protruding portion of the shaft.

2. The electric tool of claim 1, wherein the power unit has one end portion and further has another end portion opposite to the one end portion, wherein the protruding portion of the shaft comprises a first shaft protruding beyond the one end portion of the power unit, the first shaft being driven by the motor through the speed-reduction gearing, and wherein a second shaft is driven directly by the motor and protrudes beyond the other end portion of the power unit, such that the power unit may be removed from the socket in the housing and reinserted therein in a desired orientation to provide two distinct speeds for the tool.

3. The electric tool of claim 2, wherein a collet is carried by the first shaft at the one end of the power unit for receiving a selected screwdriver bit, and wherein a drill chuck is carried by the second shaft at the other end of the power unit for receiving a selected drill bit, whereby the selected drill bit is driven directly by the motor for a relatively high-speed low-torque operation, and whereby the selected screwdriver bit is driven by the motor through the speed-reduction gearing for a relatively low-speed high-torque operation, such that the electric tool is adapted for use either as an electric drill or as an electric screwdriver by removal of the power unit from the socket in the housing and selective reinsertion therein in its desired orientation.

4. The electric tool of claim 1, wherein the source of electrical energy comprises batteries in the handle of the tool.

5. The electric tool of claim 1, wherein the handle comprises a depending pistol-grip handle pivotably connected to the housing, and wherein clamping means are provided between the pivotable pistol-grip handle and the housing to retain the handle on the housing at a desired angular relationship with the housing.

6. The electric tool of claim 1, wherein the housing is circular in cross section.

7. The electric tool of claim 1, wherein the housing is polygonal in cross secton.

8. The electric tool of claim 1, wherein the power unit is retained within the housing by means of a threaded shaft having a knob at a one end, the other end of the shaft engaging cooperating threads in an opening in the housing such that the shaft may be threaded into the opening to engage the power unit in the socket and prevent rotation of the power unit within the socket.

9. The electric tool of claim 1, wherein the power unit has opposite sides thereto and a key extending outwardly from each side thereof; the socket of the housing having cooperating keyways therein such that the power unit is received in the socket and retained within the housing preventing rotation of the power unit within the socket.

10. The electric tool of claim 1, wherein the housing has an end, the end having threads thereabout and the end further having a pair of spaced-apart slots therein; the tool further having a cap having an opening therein, the cap having a shoulder depending therefrom, the shoulder further having an inner side, the inner side having threads thereabout which cooperate with the threads on the housing such that when the power unit is received in the socket, the cap may be threadably engaged to the housing to secure the power unit in the socket preventing rotation of the power unit.

11. An electric tool comprising a housing including a handle, the housing having a forwardly-opening socket formed therein, a first pair of spaced-apart electrical contacts carried by the housing and accessible internally of the socket, means within the handle for connecting the first pair of contacts with a source of electrical energy, a power unit adapted to be received within the socket and retained within the housing, a second pair of spaced-apart electrical contacts carried by the power unit and adapted to engage the first pair of spaced-apart electrical contacts when the power unit is inserted into the socket in the housing, a motor in the power unit and connected to the source of electrical energy through the engaging first and second pairs of electrical contacts, respectively, the power unit having one end portion and further having another end portion opposite to the one end portion, a shaft driven by the motor and having a portion thereof protruding beyond each end portion of the power unit, means carried by each protruding portion of the shaft to receive a tool implemert thereon, such that the power unit may be removed from the socket in the housing and reinserted therein in a desired orientation.

12. An electric tool comprising a housing including a handle, at least one electric battery disposed within the handle, the housing having a forwardly-opening socket formed therein, a first pair of spaced-apart electrical contacts carried by the housing and accessible internally of the socket, means within the handle for connecting the first pair of contacts with the electrical battery, a power unit adapted to be received within the socket and retained within the housing, a second pair of spaced-apart electrical contacts carried by the power unit and adapted to engage the first pair of spaced-apart electrical contacts when the power unit is inserted into the socket in the housing, a motor in the power unit and connected to the source of electrical energy through the engaging first and second pairs of electrical contacts, respectively, a shaft driven by the motor and having a portion thereof protruding beyond the power unit, and means carried by the protruding portion of the shaft to receive a tool implement.

13. An electric tool comprising a housing including a handle, the housing having a forwardly-opening socket formed therein, a first pair of spaced-apart electrical contacts carried by the housing and accessible internally of the socket, means within the handle for connecting the first pair of contacts with a source of electrical energy, a power unit adapted to be received within the socket and retained within the housing, a second pair of spaced-apart electrical contacts carried by the power unit and adapted to engage the first pair of spaced-apart electrical contacts when the power unit is inserted into the socket in the housing, the power unit having a one end portion and further having another end portion opposite to the one end portion, the one end portion adapted to receiving a first electric implement and the other end portion adapted to receiving a second electric implement such that the power unit may be removed from the socket in the housing and reinserted therein in a desired orientation to provide two distinct implements.

* * * * *